United States Patent [19]

Matsuta et al.

[11] Patent Number: 5,345,268
[45] Date of Patent: Sep. 6, 1994

[54] STANDARD SCREEN IMAGE AND WIDE SCREEN IMAGE SELECTIVE RECEIVING AND ENCODING APPARATUS

[75] Inventors: Toyohiko Matsuta, Katano; Masakazu Nishino, Kashiwara; Shigeru Awamoto, Osaka, all of Japan

[73] Assignee: Matsushita Electric Industrial Co., Ltd., Osaka, Japan

[21] Appl. No.: 969,964

[22] Filed: Nov. 2, 1992

[30] Foreign Application Priority Data

Nov. 5, 1991 [JP] Japan .................... 3-288335

[51] Int. Cl.⁵ .............. H04N 7/12; H04N 7/133; H04N 7/137
[52] U.S. Cl. .................. 348/384; 348/390; 348/394; 348/395; 348/400
[58] Field of Search ............ 358/133, 136, 138, 141, 358/140, 142; H04N 7/12

[56] References Cited

U.S. PATENT DOCUMENTS

| | | | |
|---|---|---|---|
| 4,884,138 | 11/1989 | Storey | 358/133 |
| 4,901,148 | 2/1990 | Nakayam et al. | 358/138 |
| 4,942,465 | 7/1990 | Ohta | 358/133 |
| 5,185,819 | 2/1993 | Ng et al. | 358/133 |

FOREIGN PATENT DOCUMENTS

| | | | |
|---|---|---|---|
| 0395440 | 10/1990 | European Pat. Off. | H04N 7/13 |
| 0515143 | 11/1992 | European Pat. Off. | H04N 7/133 |
| WO89/08368 | 9/1989 | PCT Int'l Appl. | |

OTHER PUBLICATIONS

IEEE Transactions on Consumer Electronics, vol. 37, No. 3, Aug., 1991, pp. 275–282, XPO00263196; M. Yoneda et al., "An Experimental Digital VCR with New DCT-Based Bit-Rate Reduction Ssytem", *the whole document*.

Fernseh-Undo Kino-Technik, vol. 45, No. 10, 1991, Heidelberg, DE, pp. 524–527; XPO00265565; J. Heitmann, "Wide Screen Recording", *the whole document*.

*Primary Examiner*—Tommy P. Chin
*Assistant Examiner*—Vu Le
*Attorney, Agent, or Firm*—Wenderoth, Lind & Ponack

[57] ABSTRACT

In digital video signals which differ in the number of pixels thereof, such as a standard video signal having a screen aspect ratio of 4:3 and a wide video signal having an aspect ratio of 16:9 the data quantity after encoding is equalized without increasing the compression ratio of the video signal having the larger number of pixels. An encoding apparatus performs intraframe encoding of the standard video signal so that the coded data quantity is constant in every frame, and interframe encoding of the wide video signal in each two frames so that the coded data quantity is constant in every two frames.

22 Claims, 5 Drawing Sheets

13 DATA CONTROL CIRCUIT

IMAGE A

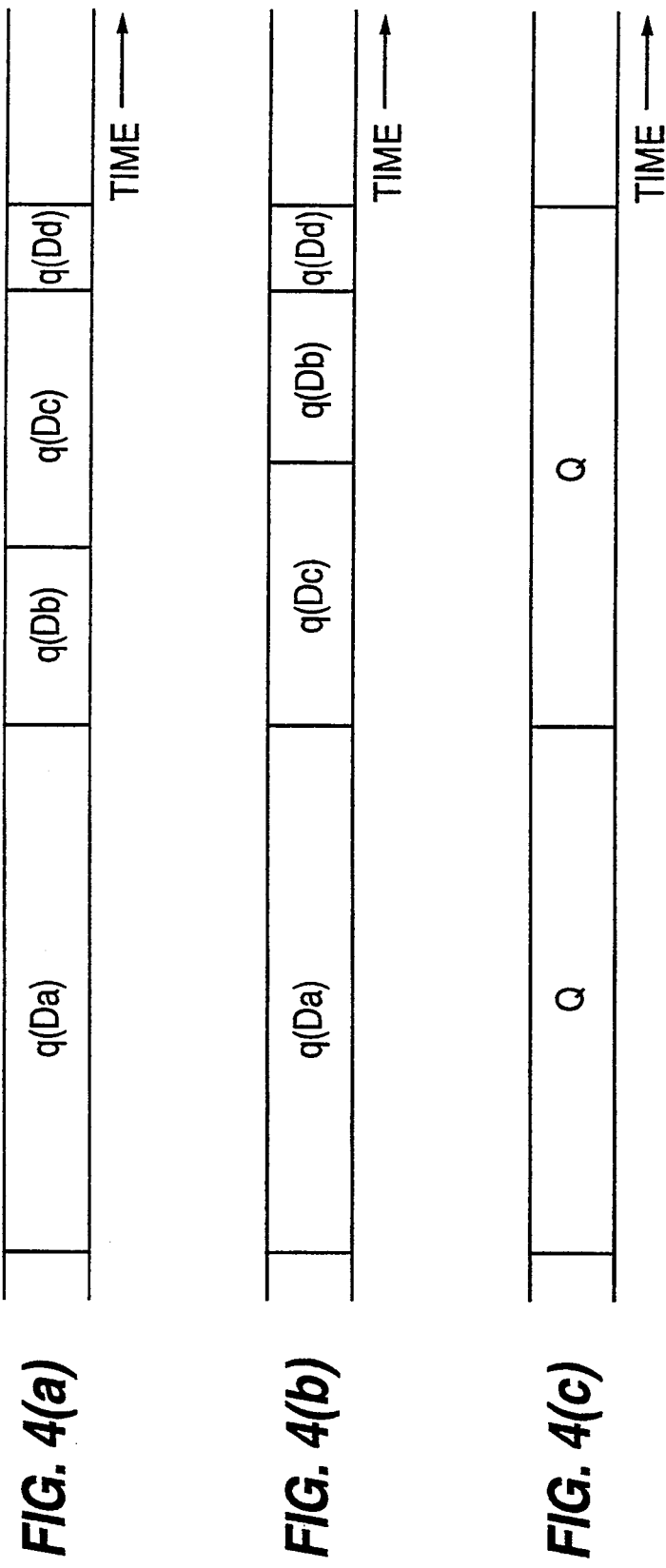

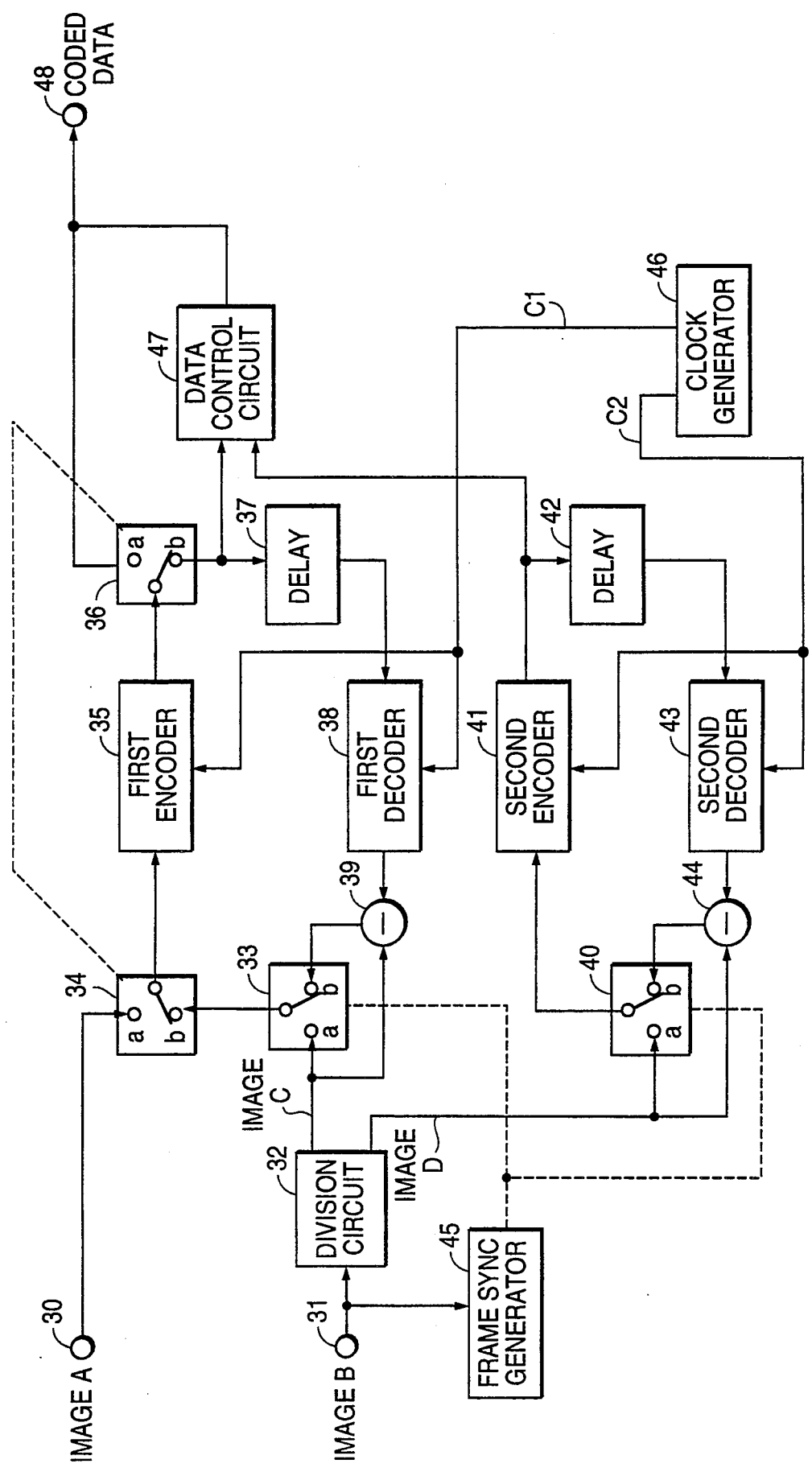

IMAGE B

IMAGE C

IMAGE D

44 DATA CONTROL CIRCUIT

STANDARD SCREEN IMAGE AND WIDE SCREEN IMAGE SELECTIVE RECEIVING AND ENCODING APPARATUS

BACKGROUND OF THE INVENTION

1. Field of the Invention

The present invention relates to a video signal encoding apparatus for encoding a video signal by employing a high efficiency encoding method.

2. Description of the Prior Art

Generally, when recording or transmitting a video signal which has an extremely large quantity of information, it is attempts are made to reduce the quantity of information by high efficiency encoding to such an extent that deterioration of image quality is not visually apparent.

For example, in "AN EXPERIMENTAL DIGITAL VCR WITH NEW DCT-BASED BIT-RATE REDUCTION SYSTEM" by M. Yoneda, et al., IEEE Transactions on Consumer Electronics Vol. 37, No. 3, August 1991, pp. 275-282, such a VCR is disclosed that is capable of recording and reproducing a standard image signal and a high definition image signal by employing orthogonal transformation as a high efficiency encoding method.

This VCR is capable of recording and reproducing different kinds of video signals which differ from each other in the number of pixels, that is, in the sampling frequency, such as a standard picture signal with an aspect ratio of 4:3 and a wide picture signal with an aspect ratio of 16:9. However, such a VCR suffers the following drawbacks.

When the compression ratios in encoding of video signals differing in the number of pixels are the same, the coded data quantities correspond to the respective numbers of pixels. As a result, in the apparatus for recording and reproducing, the recordable time differs, or the recording density in the recording medium must be increased.

On the other hand, when it is attempted to make the coded data quantities of video signals differing in the number of pixels to be the same, the picture quality of the image having a large number of pixels will be deteriorated. Hence, for the image with a large number of pixels, another means for encoding which is distinct from the one use for encoding the standard picture signal is needed, which leads to a complicated circuit composition and recording format.

SUMMARY OF THE INVENTION

It is hence a primary object of the invention to present a video signal encoding apparatus for encoding video signals which differ from each other in the number of pixels such as a standard video signal a screen aspect ratio of 4:3 and a wide video signal with an aspect ratio of 16:9, without increasing the coded data quantity for the video signal having a great number of pixels, and which is advantageous with respect to the circuit scale by sharing a circuit for individual video signals.

To achieve the above object, a video signal encoding apparatus of the invention includes encoding means receiving an image A or an image B having a greater number of pixels than the image A for performing a high efficiency encoding so that the coded data quantity is constant in each frame when the image A is received, and for performing a high efficiency encoding so that the coded data quantity is constant in every two frames when the image B is received, and a data control circuit for controlling an arrangement of output coded data from the encoding means only when the image B is received.

In the invention, the thus constituted apparatus performs an intraframe encoding in every frame for the video signal having a small number of pixels and an interframe encoding in every two frames for the video signal having a large number of pixels so that the coded data quantity does not increase even in the image having a large number of pixels.

In one preferred embodiment, the encoding means may include an encoder for intraframe encoding its input image at high efficiency in every frame, a delay circuit for delaying an output of the encoder, a decoder for decoding an output of the delay circuit, a subtractor for obtaining an interframe difference between an output of the decoder and the Input image when the input image is the image B, and a switch for changing over the input image B and output of the subtractor in every frame, thereby constructing an interframe encoding means. When the input Image is the image A, the output of the encoder is used as the output of the encoding means. Thus, the encoder can be used commonly for different input images.

BRIEF DESCRIPTION OF THE DRAWINGS

FIGS. 4(a)-4(c) are conceptual diagrams showing the arrangement of coded data as the output of the data control circuit in the first embodiment.

FIG. 5 is a block diagram showing a constitution of a video signal encoding apparatus in a second embodiment of the invention.

DESCRIPTION OF THE PREFERRED EMBODIMENTS

Figure 1:
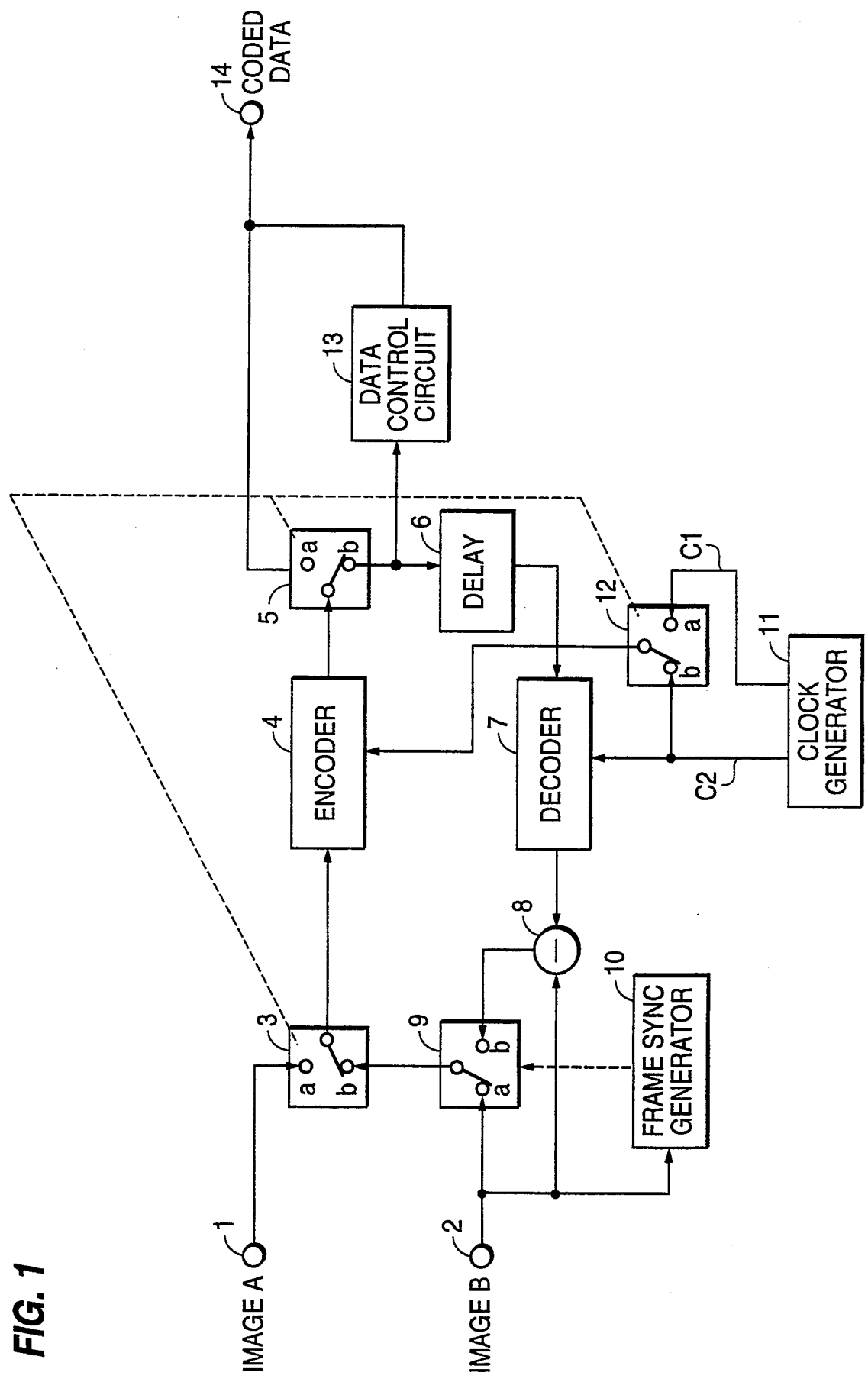
FIG. 1 is a block diagram showing a constitution of a video signal encoding apparatus in a first embodiment of the invention.

FIG. 1 is a block diagram showing a constitution of a video signal encoding apparatus in the first embodiment of the invention. The video signal encoding apparatus comprises an input terminal 1 for receiving an image A which is a standard image having a screen aspect ratio of 4:3, an input terminal 2 for receiving an image B which is a wide image signal having a screen aspect ratio of 16:9, interlock switches 3, 5 and 12 for manually changing over between the input image A and image B to be encoded (or automatic changing over may also be possible), an encoder 4 for encoding its input image on a frame by frame basis by two-dimensional orthogonal transformation, a delay circuit 6 for delaying the coded data outputted from the encoder 4, a decoder 7 for decoding the output of the delay circuit 6. a subtractor 8 for obtaining an interframe difference between the image B entered from the terminal 2 and the output of the decoder 7, a frame sync generator 10 for generating a changeover signal at frame intervals from the image B entered from the input terminal 2, a switch 9 for alterately changing over the output of the subtractor 8 and the input image B for every frame in response to the output from the frame sync generator 10, a data control circuit 13 for controlling the arrangement of the coded data from the encoder 4 when the input is the image B, a clock generator 11 for generating a clock signal C1 when the input is the image A and a clock signal C2 when the input is the image B, and an output terminal 14 for sending out the coded data.

In the diagram, the image A is a standard image signal having screen aspect ratio of 4:3, which is a digital video signal having a luminance signal sampling frequency of 3.5 MHz, and a sampling frequency of two color difference signals sampling frequency of 6.75 MHz. which is half the sampling frequency of the luminance signal. The image B is a wide image signal having screen aspect ratio of 16:9, which is a digital signal of which number of lines is the same as that of the image A, and in which the number of pixels which is 4/3 of that of the image A in the horizontal direction, and in which the sampling frequencies are 18 MHz and 9 MHz for luminance and two color difference signals, respectively each being 4/3 of that of the image A.

When encoding the image A, each of the switches 3, 5 and 12 is connected to its terminal a. Therefore, the image A is sent from the input terminal 1 into the encoder 4. In the encoder 4, the image A is intraframe encoded in every frame. This encoding process includes two-dimensional orthogonal transformation, followed by quantization and encoding. Hence, the coded data quantity in each frame of the image A is always a constant data quantity. Here, assuming the coded data quantity of one frame of the image A to be Q, a conceptual diagram of the coded data output when the image A is entered is shown in FIG. 4 (c).

On the other hand, when encoding the image B, each of the switches 3, 5 and 12 is connected to its terminal b. From the image B entered from the input terminal 2, the frame sync generator 10 generates a changeover signal at each frame interval, and the switch 9 responsive thereto is changed over frame by frame. For purposes of explanation, a first frame of each successive two frames of the image B is denoted an odd-number frame and a second frame of each successive two frames of the image B is denoted an even-number frame. First, the image data of an odd-number frame fed to the terminal a of the switch 9 is fed into the encoder 4 through the switch 3, and is subjected to intraframe encoding by two-dimensional orthogonal transformation. The coded data of the odd-number frame is entered into the data control circuit 13 through the switch 5, and is also entered into the delay circuit 6. In the delay circuit 6, the coded data is delayed so as to be delayed for one frame period at the output point of the decoder 7, and is fed into the decoder 7. In the decoder 7, decoding processing reverse to the encoding processing of the encoder 5 is done, and decoded data is sent to the subtractor 8. Since one input of the subtractor 8, which is the output of the decoder 7 is one frame period delayed the other input of the subtractor 8 is the image data of an even-number frame. Accordingly, the output of the subtractor 8 is an interframe difference data between the decoded odd-number frame data and the entered even-number frame data. The switch 9 changes over its output to each frame so as to alternately output the output of the subtractor 8 and the input image B in response to the output of the frame sync generator 10. Therefore, in the encoder 4, the interframe difference signal is subjected to intraframe encoding for the period of the input of the even-number frame of the image B.

Figure 3A:
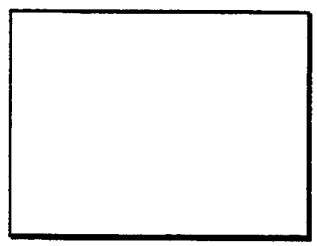
FIGS. 3(a)-3(b) are conceptual diagrams of input image data for explaining the operation of the data control circuit in the first embodiment.
Figure 3B:
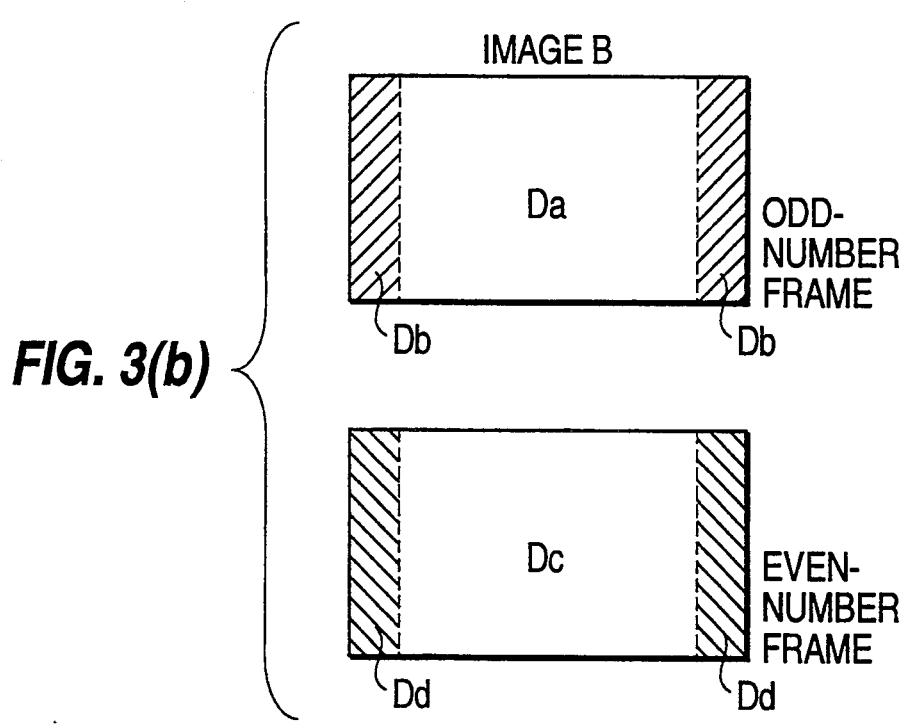

Here, the coded data quantity is explained. As mentioned above, the coded data quantity of one frame of the image A is Q. The image B is subjected to Interframe encoding in each two frames. Therefore, the data quantity is identical in every two frames. Hence, the coded data quantity for two frames is 2Q. The coded data by intraframe encoding of an odd-number frame corresponding to the number of pixels of the image A in the image B is assumed to be Da, the coded data other than the above coded data Da to be Db, the coded data by intraframe encoding of the interframe difference of an even-number frame corresponding to the number of pixels of the image A in the image B is assumed to be Dc, and the coded data other than the coded data Dc is assumed to be Dd. Conceptual diagrams of each type of coded data is shown in FIG. 3(a)–3(b) Expressing the data quantity after encoding of each coded data as the function q, encoding is effected to establish the following relation.

$$q(Da)+q(Db)+q(Dc)+q(Dd)=2Q \quad (1)$$

The relation .of the coded data quantity in the odd-number frame and even-number frame is $$q(Da)+q(Dc)=(3/2).Q \quad (2)$$

Since the image B has the number of pixels which is 4/3 of that of the image A, the following relations are obtained.

$$q(Da)=3.q(Db) \quad (3)$$

$$q(Dc)=3.q(Dd) \quad (4)$$

Moreover, the coded data quantity q(Da) of the coded data Da varies with the magnitude of the correlation between frames, and hence maintaining the relation of formula (2), $$Q \geq q(Da) \geq (\tfrac{3}{8}).Q \quad (5)$$

Hence, from formula (2) and formula (5), the data quantity q(Dc) of the coded data Dc is $$(5/6).Q \geq q(Dc) \geq (\tfrac{1}{2}).Q \quad (6)$$

Figure 2:
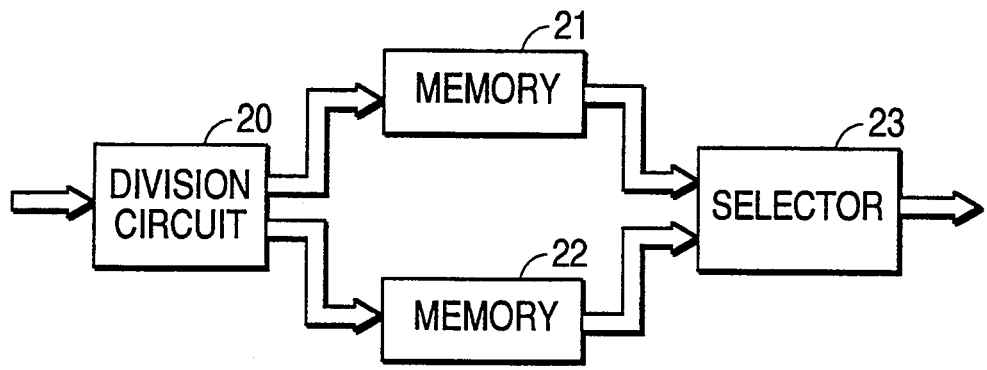
FIG. 2 is a block diagram showing a constitution of a data control circuit in the first embodiment.

The input coded data of the data control circuit 13 consists of the coded data Da, Db, Dc, and Dd, and are entered in a mixed state of Da and Db, and Dc and Dd. The data control circuit 18 comprises, as shown in FIG. 2, a division circuit 20, memories 21, 22, and a selector 23. In the division circuit, Da and Db are divided from each other, and sent to the memory 21 and the memory 22, respectively. Similarly, Dc and Dd are divided from each other, and sent to the memory 21 and the memory 22, respectively. The outputs of the memories 21 and 22 are controlled to be in the sequence of Da, Db, Dc, Dd by the selector 23. The sequence may instead be Da, Dc, Db, Dd. Conceptual diagrams of the coded data output by the input of image B at this time is shown in FIGS. 4 (a) and (b). It is controlled here so that the coded data Da may come to the beginning because Da is the coded data corresponding to the image A by intraframe encoding, and the portion corresponding to the image A among the image B may be easily reproduced by decoding only Da in every two frames.

The encoder 4 is designed to operate at a clock frequency corresponding to each image due to the difference in the number of pixels between the image A and image B. In FIG. 1, the clock generator 11 generates a clock signal C1 when encoding the image A, and a clock signal C2 when encoding the image B. These two clock signals are selected by the switch 12.

As described herein, according to the first embodiment, every frame is encoded in the image A having a smaller number of pixels, while every two frames are encoded in the image B having a greater number of pixels, and therefore the image B may be transformed into the same data quantity as the image A without increasing the picture quality deterioration.

Next is explained an encoding apparatus In the second embodiment of the Invention. FIG. 5 is a block diagram showing a constitution of the encoding apparatus in the second embodiment of the invention. This embodiment, as compared with the first embodiment, has the image B preliminarily divided into portion corresponding to the image A and another portion.

FIG. 5, numeral 30 is an input terminal for receiving the image A having a screen aspect ratio of 4:3, 31 is an input terminal for receiving the image B having a screen aspect ratio of 16:9, 32 is a division circuit for dividing the image B into a portion corresponding to the image A (image C) and a remaining portion (image D), 33 is a switch for changing over its output in every frame in response to an output of a frame sync generator 45, 34 and 36 are interlock switches each for manually (or automatically) changing over to connect to its terminal a when the input to be encoded is the image A, and to its terminal b in the case of the image B, 35 is a first encoder for intraframe encoding its input image in every frame by two-dimensional orthogonal transformation, 37 is a delay circuit for delaying the coded data from the first encoder 35, 38 is a first decoder for decoding the output of the delay circuit 37, 39 is a subtractor for obtaining an interframe difference between the image C and the output of the first decoder, 40 is a switch for changing over its output in every frame in cooperation with the switch 33, 41 is a second encoder for intraframe encoding Its input image in every frame by two-dimensional orthogonal transformation. 42 is a delay circuit for delaying the coded data from the second encoder 41, 43 is a second decoder for decoding the output of the delay circuit 42, 44 is a subtractor for obtaining an interframe difference between the image D and the output of the second decoder 43, 46 is a clock generator for generating a clock signal C1 for operating the first encoder 35 and first decoder 38 and a clock signal C2 for operating the second encoder 41 and second decoder 43, 47 is a data control circuit for controlling the arrangement of coded data by receiving the outputs from the first encoder 35 and second encoder 41, and 48 is an output terminal for sending out the coded data.

Figure 6A:
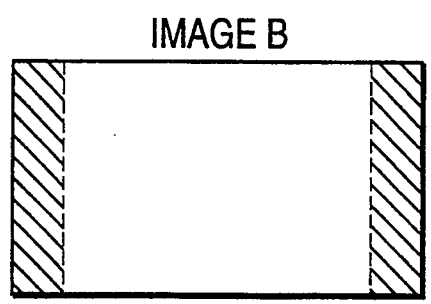
FIG. 6(a)-6(c) are conceptual diagrams of Input image data for explaining the operation of a dividing circuit in the second embodiment.
Figure 6B:
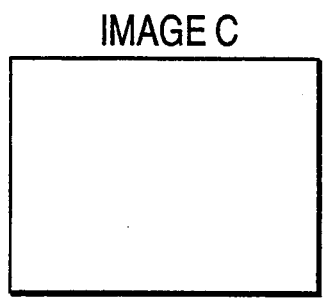
Figure 6C:
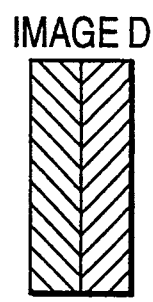

FIG. 6(a)–6(c) are conceptual diagrams of dividing the input of the image B into image C and image D by the division circuit 32.

By the loop composed of the first encoder 35, delay circuit 37, first decoder 38, subtractor 39 and switch 33, in the same way as in the first embodiment, the odd-number frame of the image C is subjected to intraframe encoding, while the even-number frame is subjected to intraframe encoding for the interframe difference. In this loop, if the input is the image C, it is processed in the same number of pixels as that of the image A, and therefore it operates with the same clock signal C1 as in the case of processing of the image A.

Likewise, by the loop composed of the second encoder 41, delay circuit 42, second decoder 43, subtractor 44 and switch 40, the odd-number frame of the image D is subjected to intraframe encoding, while the even-number frame is subjected to intraframe encoding for the interframe difference.

Figure 7:
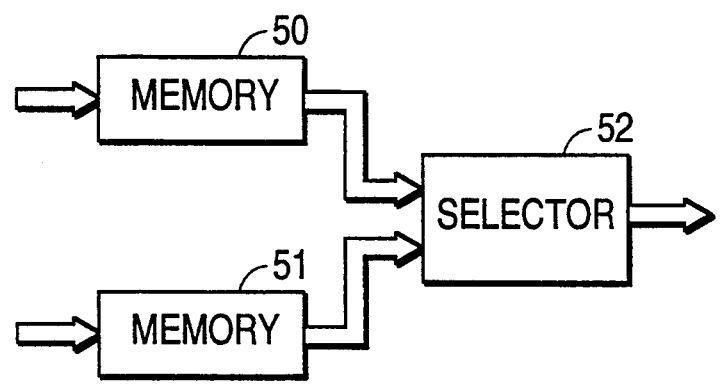
FIG. 7 is a block diagram showing a constitution of a data control circuit in the second embodiment.

More specifically, the output of the first encoder 35 corresponds to the coded data Da and Dc in the first embodiment, and the output of the second encoder 41 corresponds to the coded data Db and Dd in the first embodiment. The relation of the data quantities of the coded data is also the same as in the first embodiment. Therefore, the data control circuit 47 receives the outputs of the first encoder 34 and second encoder 41, and arranges the data in the sequence of Da, Db, Dc, Dd, or in the sequence of Da, Dc, Db, Dd. The construction of the data control circuit 47 is shown in FIG. 7. A memory 50 receives the output of the first encoder 35, and a memory 51 receives the output of the second encoder 41, and the data arrangement is controlled in a selector 52. As a result, the data are arranged as shown in FIGS. 4 (a) or (b). Meanwhile, although the image B is encoded, by the decoding technique of the image A, when only the coded data Da is decoded in every two frames, the portion corresponding to the image A in the image B (image C) may be reproduced easily.

Thus, according to the second embodiment, the image A having a small number of pixels is encoded in every frame, while the image B having a large number of pixels is encoded in every two frames. Therefore, the image B may be transformed in the same data quantity as the image A without increasing the picture quality deterioration.

In the foregoing embodiments, the delay circuit is to delay for the period of one frame at the input moment of the subtractor, and as far as this relation is sufficed, the inserting position of the delay circuit is not particularly limited.

What is claimed is:

1. A video signal encoding apparatus for selectively receiving and encoding either of an image A or an image B each constituted by successive frames, the image B having a greater number of pixels than a number of pixels of the image A, comprising:

image A encoding means for encoding each successive frame of the image A by intraframe coding to obtain image A coded data such that a data quantity of the image A coded data in each frame is constant;

image B encoding means for encoding a first frame of each two successive frames of the image B by intraframe coding to obtain image B intraframe coded data, decoding the image B intraframe coded data to obtain an image B decoded frame, and encoding a second frame of each two successive frames of the image B by interframe coding using the image B decoded frame to obtain image B interframe coded data; and data control means for controlling a sequence of the image B intraframe coded data and the image B interframe coded data to obtain image B coded data such that a data quantity of the image B coded data is constant in each two successive frames of the image B, wherein said image A encoding means and said image B encoding means share a switch means for selectively outputting the image A, the first frame of each two successive frames of the image B and the image B decoded frame, and a single encoder for encoding a selected output of said switch means to obtain the image A intraframe coded data, image B intraframe coded data and the image B interframe coded data.

2. An apparatus according to claim 1, wherein the image B has a same number of horizontal lines as a number of horizontal lines of the image A and a larger number of horizontal pixels than a number of horizontal pixels of the image A.

3. An apparatus according to claim 1, wherein each of said image A encoding means and said image B encoding means includes means for performing a two-dimensional orthogonal transformation.

4. An apparatus according to claim 1, wherein said data control means arranges, in each two successive frames of the image B, a part of the image B intraframe coded data corresponding to a part of the image B having a same number of pixels as a number of pixels of the image A to be in a same data structure as a data structure of the image A coded data.

5. An apparatus according to claim 1, wherein a data quantity of the image A coded data in each two successive frames of the image A is equal to the data quantity of the image B coded data in each two successive frames of the image B.

6. An apparatus according to claim 1, wherein, supposing that a data quantity of a part of the image B intraframe coded data corresponding to a part of the image B having a same number of pixels as a number of pixels of the image A in the first frame of each two successive frames of the image B to be q(Da) and the data quantity of the image A coded data in each frame of the image A to be Q, the data quantity q(Da) and the data quantity Q satisfy a condition expressed as $Q \geq q(Da)$.

7. A video signal encoding apparatus for selectively receiving and encoding either an image A or an image B each constituted by successive frames, the image B having a greater number of pixels than a number of pixels of the image A, comprising:

first and second input terminals for inputting therethrough the image A and the image B, respectively;

first switch means operable when the image B is received for alternately passing therethrough a first frame of each two successive frames of the image B inputted through said second input terminal and an interframe difference image between the first frame and a second frame of each two successive frames of the image B;

second switch means for selectively passing therethrough the image A inputted through said first input terminal when the image A is received and an output image from said first switch means when the image B is received;

encoding means coupled to said second switch means for encoding each successive frame of the image A to obtain image A intraframe coded data when the image A is received and for encoding, when the image B is received, the first frame of each two successive frames of the image B to obtain image B intraframe coded data and the interframe difference image to obtain image B interframe coded data;

third switch means having a first output terminal connected to an output terminal of said apparatus and a second output terminal for selectively outputting the image A intraframe coded data from said encoding means to said first output terminal and the image B intraframe coded data and the image B interframe coded data to said second output terminal;

decoding means for decoding the image B intraframe coded data from the second output terminal of said third switch means to obtain a decoded first frame of each two successive frames of the image B;

subtracting means for calculating a difference between the second frame of each two successive frames of the image B inputted through said second input terminal and said decoded first frame from said decoding means to obtain said interframe difference image; and data control means coupled to the second output terminal of said third switch means for controlling a sequence of the image B intraframe coded data and the image B interframe coded data to obtain image B coded data such that a data quantity of the image B coded data is constant in each two successive frames of the image B.

8. An apparatus according to claim 7, wherein the image A has a first sampling frequency and the image B has a second sampling frequency which is different from the first sampling frequency, and wherein said encoding means operates at a first clock frequency when encoding the image A and at a second clock frequency higher than said first clock frequency when encoding the image B.

9. An apparatus according to claim 7, wherein the image B has a same number of horizontal lines as a number of horizontal lines of the image A and a larger number of horizontal pixels than a number of horizontal pixels of the image A.

10. An apparatus according to claim 7, wherein said encoding means includes means for performing a two-dimensional orthogonal transformation.

11. An apparatus according to claim 7, wherein said data control means includes means for arranging a part of the image B intraframe coded data corresponding to a part of the image B having a same number of pixels as a number of pixels of the image A to a beginning part of a period of each two successive frames of the image B.

12. An apparatus according to claim 7, wherein said data control means arranges, in each two successive frames of the image B, a part of the image B intraframe coded data corresponding to a part of the image B having a same number of pixels as a number of pixels of the image A to be in a same structure as a data structure of the image A intraframe coded data.

13. An apparatus according to claim 7, wherein a data quantity of the image A intraframe coded data in each two successive frames of the image A is equal to the data quantity of the image B coded data in each two successive frames of the image B.

14. An apparatus according to claim 7, wherein, supposing that a data quantity of a part of the image B intraframe coded data corresponding to a part of the image B having a same number of pixels as a number of pixels of the image A in the first frame of each two successive frames of the image B to be q(Da) and a data quantity of the image A intraframe coded data in each frame of the image A to be Q, the data quantity q(Da) and the data quantity Q satisfy a condition expressed as $Q \geq q(Da)$.

15. A video signal encoding apparatus for selectively receiving and encoding either an image A or an image B each constituted by successive frames, the image B having a greater number of pixels than a number of pixels of the image A, comprising:

first and second input terminals for inputting therethrough the image A and the image B, respectively;

dividing means for dividing each frame of the image B into an image C which is a part of the image B having a same number of pixels as a number of pixels of the image A and an image D which is the remaining part of the image B;

first switch means operable when the image B is received for alternately passing therethrough the image C in a first frame of each two successive frames of the image B from said dividing means and a first interframe difference image between the image C in the first frame and the image C in a second frame of each two successive frames of the image B;

second switch means for selectively passing therethrough the image A inputted through said first input terminal when the image A is received and an output image from said first switch when the image B is received;

first encoding means coupled to said second switch means for encoding each successive frame of the image A to obtain image A intraframe coded data when the image A is received and for encoding, when the image B is received, the image C in the first frame of each two successive frames of the image B to obtain image C intraframe coded data and said first interframe difference image to obtain image C interframe coded data;

third switch means having a first output terminal connected to an output terminal of said apparatus and a second output terminal for selectively outputting the image A intraframe coded data from said encoding means to said first output terminal and the image C intraframe coded data and the image C interframe coded data to said second output terminal;

first decoding means for decoding the image C intraframe coded data from the second output terminal of said third switch means to obtain a decoded image C in the first frame of each two successive frames of the image B;

first subtracting means for calculating a difference between the image C in the second frame of each two successive frames of the image B from said dividing means and said decoded image C from said first decoding means to obtain said first interframe difference image;

fourth switch means operable when the image B is received for alternately passing therethrough the image D in a first frame of each two successive frames of the image B from said dividing means and a second interframe difference image between the image D in the first frame and the image D in the second frame of each two successive frames of the image B;

second encoding means coupled to said fourth switch means and operable when image B is received for encoding the image D in the first frame of each two successive frames of the image B to obtain image D intraframe coded data and said second interframe difference image to obtain image D interframe coded data;

second decoding means for decoding the image D intraframe coded data from the second encoding means to obtain a decoded image D in the first frame of each two successive frames of the image B;

second subtracting means for calculating a difference between the image D in the second frame of each two successive frames of the image B from said dividing means and said decoded image D from said second decoding means to obtain said second interframe difference image; and data control means coupled to the second output terminal of said third switch means for controlling a sequence of the image C intraframe coded data, the image B interframe coded data, the image D intraframe coded data and the image D interframe coded data to obtain image B coded data such that a data quantity of the image B coded data is constant in each two successive frames of the image B.

16. An apparatus according to claim 15, wherein each of said first encoding means and said first decoding means operates always at a fixed clock frequency.

17. An apparatus according to claim 15, wherein the image B has a same number of horizontal lines as a number of horizontal lines of the image A and a larger number of horizontal pixels than a number of horizontal pixels of the image A.

18. An apparatus according to claim 15, wherein each of said first and second encoding means includes means for performing a two-dimensional orthogonal transformation.

19. An apparatus according to claim 15, wherein said data control means includes means for arranging the image C intraframe coded data to a beginning part of a period corresponding to each two successive frames of the image B.

20. An apparatus according to claim 15, wherein said data control means arranges, in each two successive frames of the image B, the image C intraframe coded data to be in a same data structure as a data structure of the image A intraframe coded data.

21. An apparatus according to claim 15, wherein a data quantity of the image A intraframe coded data in each of two successive frames of the image A is equal to the data quantity of the image B coded data in each two successive frames of the image B.

22. An apparatus according to claim 15, wherein, supposing that a data quantity of the image C intraframe coded data in each two successive frames of the image B to be q(Da) and a data quantity of the image A intraframe coded data in each frame of the image A to be Q, the data quantity q(Da) and the data quantity Q satisfy a condition expressed as $Q \geq q(Da)$.

* * * * *